(12) United States Patent
Marrin (10) Patent No.: US 11,825,026 B1
(45) Date of Patent: Nov. 21, 2023

(54) SPATIAL AUDIO VIRTUALIZATION FOR CONFERENCE CALL APPLICATIONS

(71) Applicant: HEAR360 INC., Los Angeles, CA (US)

(72) Inventor: Matthew Marrin, Los Angeles, CA (US)

(73) Assignee: HEAR360 INC., Los Angeles, CA (US)

( * ) Notice: Subject to any disclaimer, the term of this patent is extended or adjusted under 35 U.S.C. 154(b) by 0 days.

(21) Appl. No.: 17/545,352

(22) Filed: Dec. 8, 2021

Related U.S. Application Data (60) Provisional application No. 63/123,644, filed on Dec. 10, 2020.

(51) Int. Cl.
*H04M 3/56* (2006.01)
*H04S 7/00* (2006.01)

(52) U.S. Cl.
CPC ............. *H04M 3/568* (2013.01); *H04S 7/302* (2013.01); *H04S 2400/11* (2013.01)

(58) Field of Classification Search
CPC ..... H04M 3/568; H04S 7/302; H04S 2400/11
See application file for complete search history.

(56) References Cited

U.S. PATENT DOCUMENTS

| | | | | |
|---|---|---|---|---|
| 7,012,630 B2 * | 3/2006 | Curry | .................... | H04M 3/568 381/26 |
| 7,346,654 B1 * | 3/2008 | Weiss | ...................... | H04N 7/15 348/E7.083 |
| 7,489,773 B1 * | 2/2009 | Moran | ................ | H04L 12/1827 370/252 |
| 7,720,212 B1 * | 5/2010 | Jouppi | ..................... | H04M 3/56 709/204 |
| 8,170,193 B2 * | 5/2012 | Curry | ....................... | H04N 7/15 379/202.01 |
| 8,509,454 B2 * | 8/2013 | Kirkeby | .................. | H04S 7/303 381/310 |
| 8,625,769 B1 * | 1/2014 | Allen | .......................... | 348/14.08 |
| 10,567,185 B2 * | 2/2020 | Cartwright | .......... | H04L 65/1083 |
| 2003/0081115 A1 * | 5/2003 | Curry | ....................... | H04N 7/15 381/26 |
| 2008/0095079 A1 * | 4/2008 | Barkley | .................. | H04L 67/61 370/260 |
| 2008/0144794 A1 * | 6/2008 | Gardner | ................ | H04M 3/568 379/202.01 |

(Continued)

FOREIGN PATENT DOCUMENTS

| | | | | |
|---|---|---|---|---|
| NO | 339830 B1 * | 2/2017 | ............... | H04S 3/00 |
| WO | WO-2013142641 A1 * | 9/2013 | ............. | G06F 3/048 |

(Continued)

*Primary Examiner* — Akelaw Teshale
(74) *Attorney, Agent, or Firm* — patenttm.us (57) ABSTRACT

The present invention relates to a device and a computerized process for creating a virtual spatial audio representation of sound sources within a conference call application, which processes individual user voice or audio inputs according to a host or user selected spatial position, combining it with other users virtualized spatial audio positions, to simulate the sound properties of a real world in-person meeting, conference, convention, or event. This computerized process is embodied by software that can be used to process multiple incoming audio sources from multiple platform participants with different spatial audio filters to create a unique spatial positioning for each participant. It should be further noted that a single host could control the spatial positioning of all participants on the platform, or each participant could select from a defined set of available seats or positions based on their own personal preferences.

19 Claims, 5 Drawing Sheets

Computer, integrated circuit, or microchip required to run all forms of the invention.

(56) References Cited

U.S. PATENT DOCUMENTS

| | | | | |
|---|---|---|---|---|
| 2008/0260131 | A1* | 10/2008 | Akesson | H04M 3/568 379/202.01 |
| 2009/0080632 | A1* | 3/2009 | Zhang | H04M 3/56 379/202.01 |
| 2010/0303266 | A1* | 12/2010 | Chen | H04R 27/00 381/310 |
| 2010/0316232 | A1* | 12/2010 | Acero | H04R 27/00 379/202.01 |
| 2011/0196682 | A1* | 8/2011 | Sandgren | H04M 3/56 704/270 |
| 2015/0049868 | A1* | 2/2015 | Boustead | H04M 3/568 379/202.01 |
| 2015/0098571 | A1* | 4/2015 | Jarvinen | H04S 7/302 381/1 |
| 2018/0027123 | A1* | 1/2018 | Cartwright | H04M 3/42221 379/202.01 |
| 2018/0027351 | A1* | 1/2018 | Cartwright | H04M 3/56 381/303 |
| 2018/0191912 | A1* | 7/2018 | Cartwright | H04M 3/565 |
| 2018/0279063 | A1* | 9/2018 | Sun | H04S 7/302 |
| 2018/0359294 | A1* | 12/2018 | Brown | H04S 7/306 |
| 2022/0137916 | A1* | 5/2022 | Varekamp | H04L 12/1827 700/94 |

FOREIGN PATENT DOCUMENTS

| | | | | |
|---|---|---|---|---|
| WO | WO-2013142668 | A1 * | 9/2013 | H04M 3/568 |
| WO | WO-2014052429 | A1 * | 4/2014 | H04M 3/561 |
| WO | WO-2014159376 | A1 * | 10/2014 | H04M 3/568 |
| WO | WO-2016126768 | A2 * | 8/2016 | G10L 15/005 |

* cited by examiner

Computer, integrated circuit, or microchip required to run all forms of the invention.

SPATIAL AUDIO VIRTUALIZATION FOR CONFERENCE CALL APPLICATIONS

CROSS-REFERENCE TO RELATED APPLICATIONS

This application claims benefit of U.S. Provisional Patent Application Ser. No. 63/123,644, filed Dec. 10, 2020.

BACKGROUND OF THE INVENTION

1. Field of the Invention

The present invention relates generally to spatial audio virtualization for conference call applications.

2. Background

Currently there are a number of solutions for creating a virtual meeting or conference call. Some of these solutions attempt to create a sense of space by arranging the video windows of each participant in an line, group, or gallery that allows you to see everyone in a meeting at the same time on a single screen, but these solutions fail to meet the needs of the industry because the voices of the participants are presented and all mixed in mono, and do not follow the same positioning as the video window's position that the voice originates from. Other solutions attempt to feature a particular video window from a participant who is dominating the conversation to enhance focus, but these solutions are similarly unable to meet the needs of the industry because they are unnatural—non-vocal participants in a physical in-person meeting are not blocked out from our view when a vocally dominant participant engages. Still other solutions seek to create a rich menu of social communication tools by adding the ability to share files, and chat via text message, but these solutions also fail to meet industry needs because they do not provide the ability to mix in ambient outside groups that are not meant to engage in the personal groups conversation, but are meant to add emotive feedback by way of clapping, cheering, or screaming, which would be advantageous if there were multiple conference call groups all watching or connected to a single event or concert.

It would be desirable to have a computerized process for creating a simulated virtual spatial audio presentation of multiple conference call participants which is capable of arranging the participants throughout a space that more closely represents a real world, in-person meeting or conference. In the real world, we don't hear external sound sources coming from the middle of our head or from a single set of speakers like current conference call applications provide, we hear external sound coming from a position and a direction from where each users sound or voice actually originates from. Furthermore, it would also be desirable to have a computerized process that allows for a host or user to select the seating arrangement, or spatial audio characteristics that will be applied to each participant. Still further, it would be desirable to have a computerized process for creating multiple spatial audio profiles and settings for each participant, so that one set can be used for close proximity groups to allow for intelligible conversations, and another spatial audio profile to be set for outside groups, so that those groups can detect the presence of outside groups, for example, the cheering or applause of an outside group along with their spatial representation and reflective characteristics, without hearing their intimate conversation. Therefore, there currently exists a need in the industry for a process that is capable of creating more realistic virtual conference calls and meetings to more closely match the sound experience that we get in an in-person meeting, conference, or event. By applying spatial audio characteristics to conference call participants, we can improve the intelligibility of the conversation, and enhance the emotional response between the participants by providing realistic group feedback, all features which are currently unavailable on current conference call platforms.

SUMMARY OF THE INVENTION

The present invention advantageously fills the aforementioned deficiencies by providing Spatial audio virtualization for conference call applications which provides a computerized process for creating a virtual spatial audio representation of sound sources within a conference call application, which processes individual user voice or audio inputs according to a host or user selected spatial position, combining it with other users virtualized spatial audio positions, to simulate the sound properties of a real-world in-person meeting, conference, convention, or event. This computerized process is embodied by software that can be used to process multiple incoming audio sources from multiple platform participants with different spatial audio filters to create a unique spatial audio positioning for each participant. It should be further noted that a single host could control the spatial positioning of all participants on the platform, or each participant could select from a defined set of available seats or positions based on their own personal preferences.

Figure 1:
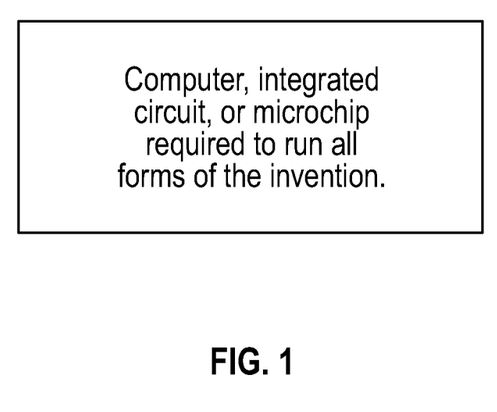
FIG. 1 shows a Computer, integrated circuit, or microchip required to run all forms of the invention.
Figure 2:
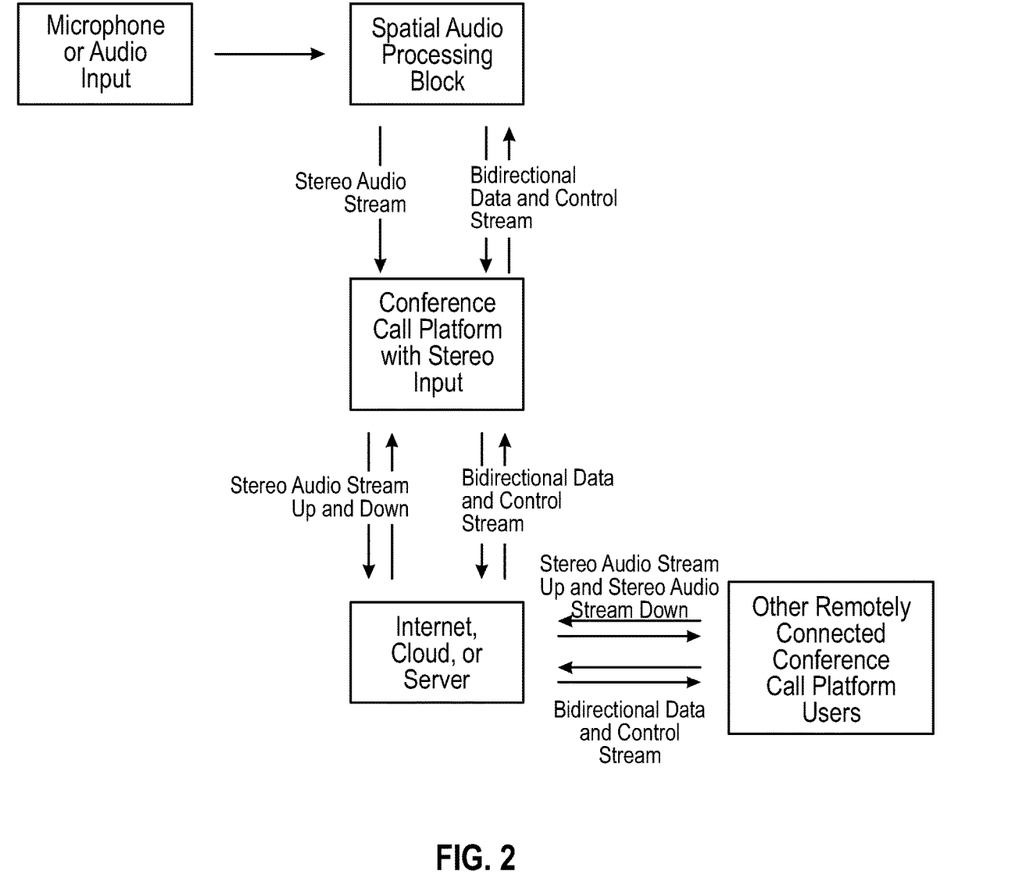
FIG. 2 shows version 1 of the invention

The present invention is a computerized process for creating a plurality of spatial audio environments and locations within a conference call platform, and also for processing and placing conference call platform participants into those created spatial audio environments and locations. This computer process is made up of the following executable steps:

- Version 1 Step 1: A microphone or audio source input is intercepted by an audio driver or virtual audio path A that routes said input to a spatial audio processing block.
- Version 1 Step 2: The spatial audio processing block applies a spatial audio filter and environment profile to the microphone or audio source input.
- Version 1 Step 3: A stereo output from the spatial audio processing block is sent to a audio driver or virtual audio path B.
- Version 1 Step 4: The audio driver or virtual audio path B is sent to the audio input of a conference call platform such as "Zoom", where it is integrated into a live conference call.
- Version 1 Step 5: Each remote conference call participant has their own local spatial audio processing block and their own audio is processed in the same manner as described in
- Version 1 Step 1-4.
- Version 1 Step 6: All participants spatial audio processing blocks are connected to a spatial audio control server that is capable of controlling the settings of each individual participants spatial audio processing block.
- Version 1 Step 7: The spatial audio control server can be controlled by a host application, or by any or all users that are configured to access it.

Figure 3:
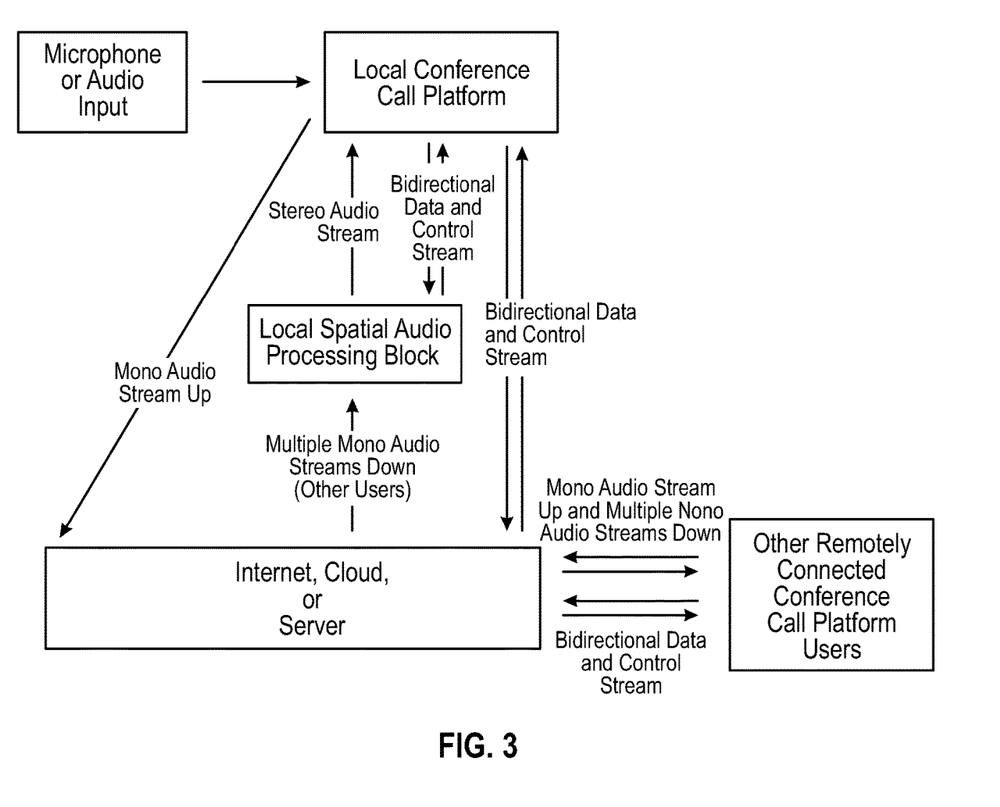
FIG. 3 shows version 2 of the invention

The present invention may also function using the following executable steps:

Version 2 Step 1: A microphone or audio source input is intercepted by an audio driver or virtual audio path that routes said input to the input of a local conference call platform.

Version 2 Step 2: The microphone or audio source input is transmitted from the conference call platform to other participants over the internet using a peer to peer connection to each remote participant.

Version 2 Step 3: A local spatial audio processing block receives a plurality of audio inputs from other call participants that are transmitted over the internet using a peer to peer connection for each participant on the call.

Version 2 Step 4: Each individual audio stream that is received in the local spatial audio processing block is assigned its own spatial audio filter.

Version 2 Step 5: The local spatial audio processing block sums all of the individual spatialized audio streams into one stereo mix and outputs the stereo mix to the local conference call platforms monitor section so the local user can hear all of the spatialized remote participants.

Version 2 Step 6: All spatial audio stream settings within each participants spatial audio processing blocks are connected to a spatial audio control panel within the local conference call platform and the internet, cloud, or servers that are capable of controlling the settings of each individual participants spatial audio processing block.

Version 2 Step 7: The spatial audio control panel can be controlled by a host application, or by any or all users that are configured to access it.

Version 2 Step 8: Version 2 Steps 1-7 above apply to all conference call participants.

Figure 4:
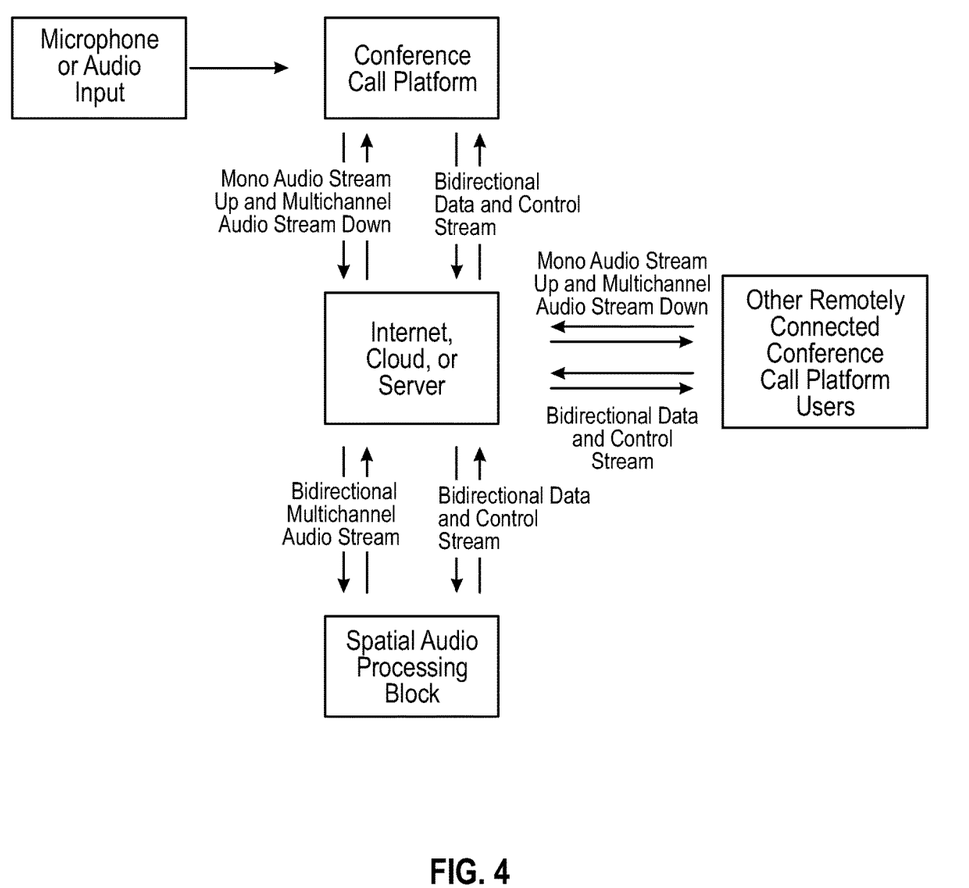
FIG. 4 shows version 3 of the invention

The present invention may also function using the following executable steps:

Version 3 Step 1: A conference call platform accepts a microphone or audio source input.

Version 3 Step 2: The conference call platform sends the microphone or audio source to the internet, cloud, or server, where it is processed on a cloud server system.

Version 3 Step 3: The cloud server sends the microphone or audio to a spatial audio processing block.

Version 3 Step 4: The spatial audio processing block applies a close proximity and a distant proximity spatial audio filter and environment profile to the microphone or audio source input.

Version 3 Step 5: The process described in version 3 steps 1-4 is repeated and applied to as many additional conference call participants that are part of a conference call, group, or event.

1 Version 3 Step 6: The spatial audio settings for all of the participants can be controlled by the conference call's local host application, or by any or all users that are configured to access it.

Version 3 Step 7: The conference call host can designate which participants will be included in the Close Proximity spatial audio profile, and which participants or groups of participants will be included in the Distant Proximity spatial audio profile.

Version 3 Step 8: If a conference call is organized around an event by which multiple other conference calls are organized, each conference call can be considered its own group for the purpose of the event.

Version 3 Step 9: The spatial audio processing block creates multiple summed mixes of all of the audio source inputs, one Close Proximity spatial audio profile for each group that is connected to an event, and one Distant Proximity profile for each group that is connected to an event.

Version 3 Step 10: Each groups Close Proximity spatial audio profile mix output is sent back to each individual user of their corresponding group, and each groups Distant Proximity spatial audio profiles are all mixed together into one large Distant Proximity audio profile mix. This one large Distant Proximity audio profile is also sent to each conference call group that is connected to an event.

Version 3 Step 11: Each event group conference call receives both a Close Proximity spatial audio output stream and a Distant Proximity spatial audio stream from the spatial audio processing block server. The Close Proximity spatial audio stream may include only the individuals within that particular group, and the Distant Proximity stream may include all other outside groups that are related to the event, but not related to all of the other groups or users.

Version 3 Step 12: Each individual participant within a conference call will have the ability to customize and change the levels of the Close Proximity and Distant Proximity spatial audio profiles that they receive from the Spatial Audio Processing Block Server.

The software of the present invention is unique when compared with other known solutions in that it provides the ability for a conference call or virtual meeting host to position the other attending participants in space, with directional, spatial audio that represents that space. This is unique due to the fact that other conference call or virtual meeting platforms only deliver participants audio in non-directional, non-spatial, mono audio, which provides no directional or spatial cues for the other participants.

The present invention software is unique when compared with other software solutions in that is incorporates the ability to connect multiple conference call groups together, like connecting a series of private sporting event box suites and allowing them to hear each other for the purpose of sharing audible emotional feedback that relates to an event that all conference call groups are connected to and able to monitor.

Among other things, it is an object of the present invention to provide spatial audio virtualization for conference call applications that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The present invention is directed to spatial audio virtualization for conference call applications.

Figure 5:
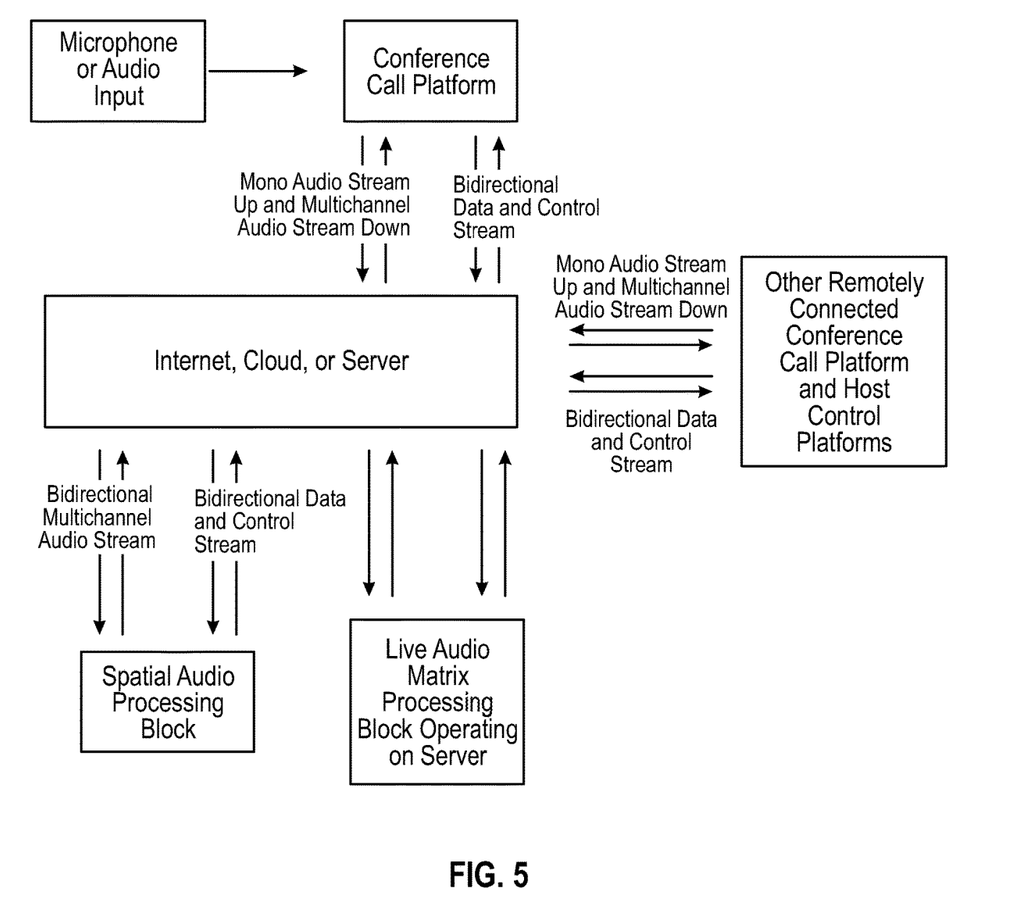
FIG. 5 shows version 4 of the invention

In its most complete and preferred version, the software is made up of the following executable steps:

Version 4 Step 1: A conference call platform accepts a microphone or audio source input.

Version 4 Step 2: The conference call platform sends the microphone or audio source input to a spatial audio processing block that operates on a remote cloud server system.

Version 4 Step 3: The spatial audio processing block copies the microphone or audio source input into multiple, separate, processing paths (for example, 3 separate copies and paths).

Version 4 Step 4: The spatial audio processing block applies a close proximity spatial audio filter and environment profile to the microphone or audio source input copy #1, a distant proximity spatial audio filter and environment profile to the microphone or audio source input copy #2, and passes microphone or audio source input copy #3 to a live audience matrix processing block.

Version 4 Step 5: The process described in version 4 steps 1-4 is repeated and applied to as many additional conference call participants that are part of a conference call, group, or event.

Version 4 Step 6: The live audience matrix processing block ingests, and mixes all incoming audio signals to emulate a live audience or crowd, and then distributes those mixes to loudspeaker systems within an actual live event space, conference, or stadium, where a connected event is actually taking place, to simulate the sound and response of a real live crowd at the event, where the actual participants are all connected remotely, with no physical presence required at the event. For example, the players in a football game could hear live remote audience feedback during game play, even though there is no physical audience present at the stadium.

Version 4 Step 7: The Live Audience Matrix processing block can be controlled by a designated platform or by broadcast administration personnel associated with a connected event.

Version 4 Step 8: The spatial audio settings for all of the conference call participant's personal audio monitors can be controlled by the conference call's local host application, or by any or all users that are configured to access it.

Version 4 Step 9: The conference call host can designate which participants will be included in the Close Proximity spatial audio profile, and which participants or groups of participants will be included in the Distant Proximity spatial audio profile.

Version 4 Step 10: If a conference call is organized around an event by which multiple other conference calls are organized, each conference call can be considered its own group for the purpose of the event.

Version 4 Step 11: The spatial audio processing block server creates multiple summed mixes of all of the audio source inputs, one Close Proximity spatial audio profile for each group that is connected to an event, and one Distant Proximity profile for each group that is connected to an event.

Version 4 Step 12: Each groups Close Proximity spatial audio profile mix output is sent back to each individual user of their corresponding group, and each groups Distant Proximity spatial audio profiles are all mixed together into one large Distant Proximity audio profile mix. This one large Distant Proximity audio profile is also sent to each conference call group that is connected to an event.

Version 4 Step 13: Each event group conference call receives both a Close Proximity spatial audio output stream and a Distant Proximity spatial audio stream from the spatial audio processing block server. The Close Proximity spatial audio stream may include only the individuals within that particular group, and the Distant Proximity stream may include all other outside groups that are related to the event, but not related to all of the other groups or users.

Version 4 Step 14: Each individual participant within a conference call will have the ability to customize and change the levels of the Close Proximity and Distant Proximity spatial audio profiles that they receive from the Spatial Audio Processing Block Server.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A spatial audio virtualization process for plural remote participants, comprising:

Step 1, intercepting an audio source input and routing said input to a spatial audio processor;

Step 2, said spatial audio processing block applying a spatial audio filter and an environment profile to the input;

Step 3, sending a stereo output from the spatial audio processor to a first output;

Step 4, sending the first output sent to an audio input of a conference call platform for integration into a live conference call;

wherein plural ones of said remote participants have a spatial audio processing block and audio from said ones of remote participants is processed in accordance with steps 1-4 above, wherein spatial audio processing blocks of said plural ones of remote participants are connected to a spatial audio control server that is capable of controlling the spatial audio filter and environment profile settings of ones of said participants spatial audio processing blocks.

2. The spatial audio virtualization process for plural remote participants according to claim 1, wherein said spatial audio control server is controlled by a host application.

3. The spatial audio virtualization process for plural remote participants according to claim 1, wherein said spatial audio control server is controlled by users that are configured to access it.

4. The spatial audio virtualization process for plural remote participants according to claim 1, wherein said first output comprises an audio driver.

5. The spatial audio virtualization process for plural remote participants according to claim 1, wherein said first output comprises a virtual audio path.

6. The spatial audio virtualization process for plural remote participants according to claim 1, wherein said conference call platform comprises a video/audio conference call platform.

7. The spatial audio virtualization process for plural remote participants according to claim 1, wherein said remote participants are remote conference call participants.

8. A spatial audio virtualization process for plural remote participants, comprising:
- Step 1, Intercepting an audio source input and routing said input to a local conference call platform;
- Step 2: transmitting the audio source input is from the conference call platform to other participants over the internet using a peer to peer connection to said participants;
- Step 3: providing a plurality of audio inputs from other call participants that are transmitted over the internet using a peer to peer connection for each participant on the call to a local spatial audio processing block;
- Step 4: assigning a spatial audio filter to Each individual audio stream that is received in the local spatial audio processing block;
- Step 5: The local spatial audio processing block summing all of the individual spatialized audio streams into a stereo mix and outputting the stereo mix to a monitor section of the local conference call platform so the local user can hear all of the spatialized remote participantsi
- Step 6, all spatial audio stream settings within each participant's spatial audio processing blocks are connected to a spatial audio control panel within the local conference call platform and the internet, cloud, or servers that are capable of controlling the settings of each individual participant's spatial audio processing block.

9. The spatial audio virtualization process for plural remote participants according to claim 8, further comprising step 7, the spatial audio control panel can be controlled by a host application, or by any or all users that are configured to access it.

10. The spatial audio virtualization process for plural remote participants according to claim 9, wherein the steps 1-7 above are applied to all conference call participants.

11. A conference call platform, comprising the following executable steps:
- Step 1: accepting an audio source input at a conference call platform;
- Step 2: sending the audio source to the internet, cloud, or server, where it is processed on a cloud server system;
- Step 3: The cloud server system sending the audio source to a spatial audio processing block;
- Step 4: The spatial audio processing block applying a close proximity spatial audio filter and a distant proximity spatial audio filter and an environment profile to the audio source input.

12. A conference call platform according to claim 11, further comprising:
- Step 5: repeating steps 1-4 applied to as many additional conference call participants that are part of a conference call, group, or event.

13. A conference call platform according to claim 11, further comprising:
- controlling spatial audio settings for all of the participants of a conference call, group, or event by a conference call local host application, or by any or all users that are configured to access it.

14. A conference call platform according to claim 11, further comprising:
- designating by a conference call host which participants of a conference call, group, or event will be included in the close proximity spatial audio filter profile, and which participants or groups of participants will be included in the distant proximity spatial audio filter profile.

15. A conference call platform according to claim 11, wherein multiple conference calls are organized around an event by which multiple other conference calls are organized, each conference call is considered its own group for the purpose of the event.

16. A conference call platform according to claim 15, wherein the spatial audio processing block creates multiple summed mixes of all of the audio source inputs, one close proximity spatial audio filter profile for each group that is connected to an event, and one distant proximity spatial audio filter profile for each group that is connected to an event.

17. A conference call platform according to claim 16, wherein Each group's close proximity spatial audio filter profile mix output is sent back to each individual user of their corresponding group, and each group's distant proximity spatial audio filter profiles are all mixed together into one large distant proximity audio filter profile mix and this one large distant proximity audio filter profile is also sent to each conference call group that is connected to an event.

18. A conference call platform according to claim 15, wherein each event group conference call receives both a close proximity spatial audio output stream and a distant proximity spatial audio stream from the spatial audio processing block server, wherein the close proximity spatial audio stream may include only the individuals within that particular group, and the distant proximity stream may include all other outside groups that are related to the event, but not related to all of the other groups or users.

19. A conference call platform according to claim 11, wherein each individual participant within a conference call has the ability to customize and change the levels of the close proximity spatial filter and distant proximity spatial audio filter profiles that they receive from the Spatial Audio Processing Block Server.

* * * * *